United States Patent [19]
Miller et al.

[11] Patent Number: 4,987,035
[45] Date of Patent: Jan. 22, 1991

[54] CERAMIC JOINTS

[75] Inventors: Bradley J. Miller, Worcester; Donald O. Patten, Jr., Sterling, both of Mass.

[73] Assignee: Norton Company, Worcester, Mass.

[21] Appl. No.: 316,366

[22] Filed: Feb. 27, 1989

Related U.S. Application Data

[63] Continuation-in-part of Ser. No. 106,193, Oct. 7, 1987, abandoned.

[51] Int. Cl.$^5$ .............................................. F16D 1/02
[52] U.S. Cl. .................................... 428/599; 428/627; 428/673; 428/450; 403/272; 403/404
[58] Field of Search ............... 428/544, 599, 627, 673, 428/450; 403/271, 272, 404

[56] References Cited

U.S. PATENT DOCUMENTS

| | | | |
|---|---|---|---|
| 4,552,024 | 11/1985 | Baker et al. | 73/821 |
| 4,659,245 | 4/1987 | Hirao et al. | 403/272 |
| 4,747,722 | 5/1988 | Kawaguchi et al. | 403/272 |

Primary Examiner—John P. Sheehan
Assistant Examiner—George Wyszomierski
Attorney, Agent, or Firm—Arthur A. Loiselle, Jr.

[57] ABSTRACT

Butt joints between materials having different coefficients of thermal expansion are prepared having a reduced probability of failure of stress facture. This is accomplished by narrowing/tapering the material having the lower coefficient of thermal expansion in a direction away from the joint interface and not joining the narrow-tapered surface to the material having the higher coefficient of thermal expansion.

25 Claims, 15 Drawing Sheets

FIG. 9 PROBABILITY OF FAILURE VERSUS ANGLE OF BOND TERMINUS

CERAMIC JOINTS

RIGHTS OF THE UNITED STATES GOVERNMENT HEREIN

The technical work which led to this application was performed under Contract DE-AC05-840R21400 (Subcontract No.—86X-00208C) —[W(A)-86,027 ORO-286]. The U.S. government, accordingly, has certain rights under any patent granted on this application.

CROSS-REFERENCE TO RELATED APPLICATION

This application is a continuation-in-part of U.S. Ser. No. 106,193, filed Oct. 7, 1987, abandoned.

TECHNICAL FIELD

This invention relates to the joining of two materials which have different coefficients of thermal expansion. More particularly, the invention relates to the formation of a butt joint between two materials, one of which has both a lower coefficient of thermal expansion and a lower fracture toughness than the other. Still more particularly, the invention relates to the butt joining of a ceramic to a metal. The present invention enables the joining of such materials in such a manner that the probability of failure of the joint, predominantly due to stress fractures in the material having the lower coefficient of thermal expansion, is reduced. Most particularly, this invention relates to the formation of a butt joint between a ceramic material and a metal material wherein the geometry of the ceramic material away from the joining surface is modified so as to reduce the possibility of stress fracture in the ceramic material. The greater the difference between the coefficients of thermal expansion, the greater will be the value of this invention.

TECHNICAL BACKGROUND

Making joints between materials as dissimilar as metals and ceramics generally requires high temperature joining methods such as brazing or diffusion bonding. When such a joint is cooled to a lower temperature for use or for later manufacturing processes, stresses inherently develop within the joined materials. This occurs because the higher coefficient of thermal expansion material near the joint is precluded, by being joined to a lower coefficient of thermal expansion material, from contracting as much as would be expected from the temperature change. The bond forces the two joined materials to retain the same dimension along the area of the joint. Therefore, the joined material having the lower coefficient of thermal expansion develops a compressive stress in the interior of the joint and a tensile stress near the bond terminus of the joint.

Quantification of the stress patterns in a joint can be obtained by the established method of finite element analysis, hereinafter referred to as "FEA." A standard reference work for this method is O. C. Zienkiewicz, *The Finite Element Method*, 3rd Ed., McGraw Hill, London, 1977. Computer programs are available commercially for efficient practice of FEA. An example of such a program is ANSYS TM leased by Swanson Analysis Systems, Inc., Houston, Pa.

FEA involves calculating the mechanical characteristics of actual bodies by a series of approximations, in each of which the actual body is treated as if it were divided by a "mesh" into distinct elements. The behavior of the entire body is then determined by summing the contributions of the individual elements. Such calculations are performed with successively finer mesh sizes until the values reach a finite value without changing, within a predetermined tolerance limit, as the mesh size is made finer, or else grow ever larger as the mesh size is made finer. The latter behavior is described in the art as "singular" or "a singularity" and the former as convergent or finite.

If a material is made of a high quality single crystal without significant surface damage, or if the material is ductile, as are most metals, its mechanical properties will normally be highly consistent from sample to sample and will be determined by the strength of the chemical bonds in the material. In the more usual case of a brittle polycrystalline material, or even of single crystal material with less than meticulous surface preparation, the MOR will be less precisely reproducible and will be lower on average than for a flawless single crystal of the same nominal chemical composition. The difference arises from microscopic irregularities or flaws present at almost any interface, including the external surface and the numerous internal interfaces in the interior of polycrystalline materials. Brittle materials are known to behave as if rupturing forces were concentrated at flaws rather being uniformly distributed over the entire stressed area of the material.

The stress required to rupture practical non-ductile polycrystalline materials often show a wide statistical fluctuation, but for reproducibly prepared materials, fairly consistent failure statistics can be obtained, and they serve as an adequate guide to engineering design with the materials involved. One of the most often used methods of statistically treating the variability of the modulus of rupture is given by W. Weibull, "A Statistical Theory of the Strength of Materials," *Ingeniors Handl.* (*Proceedings of the Royal Swedish Institute for Engineering Research*), No. 151, 1939. This method allows calculation of a probability of failure for an object made of a specified material, given the distribution of stresses in the object and certain statistical parameters designated as the Weibull modulus and the characteristic strength of the material.

Metal to ceramic joints with the metal tapered at the bond terminus or edge of the joint have been occasionally used in the prior art, apparently on an empirical basis. In addition, ceramics and metals have been tapered in a matching fashion such that the tapered ceramic surface fits inside a tapered metal surface and is joined thereto (U.S. Pat. No. 4,679,960, Mizuhara). However, no prior use of ceramic to metal joints with the ceramic tapered away from the bond terminus and wherein the tapered surface is not bonded to the metal is known to applicants.

SUMMARY OF THE INVENTION

It has been found that practically useful joints may be prepared between two dissimilar materials wherein the first material has (i) a lower coefficient of thermal expansion (CTE) and (ii) a lower fracture toughness ($K_c$) than the second material. These joints are formed by tapering the surface of the first material in a direction away from the joint and not joining the tapered surface to the second material. Preferably, the first material is a ceramic and the second is a metal.

It has also been found that the angle of the taper of the first material is important to minimizing fracture failure of the first material and that by using finite element analysis in combination with Weibull statistics the probability of failure of the joint can be reduced to any desired pre-determined practical level, if the Weibull parameters of the first material are known and are within a practical range.

The present invention is applicable to joints having intermediate layers, such as of highly ductile metals, as well as simple joints.

DESCRIPTION OF THE PREFERRED EMBODIMENTS

The present invention is directed towards making flat or butt joints between two dissimilar materials, wherein one material has a lower coefficient of thermal expansion and a lower fracture toughness than the other. Particularly, it is directed to forming a butt joint between a ceramic material and a metal material. Most particularly, it is directed to incorporating a ceramic wear surface on a metal surface.

As indicated, this invention is particularly applicable to joints between ceramics and metals. Generally the ceramic material will be the one with the lower coefficient of thermal expansion and the lower fracture toughness. Examples of suitable ceramic materials include silicon carbide, silicon nitride, aluminum nitride, alumina, boron carbide, zirconia, sialon, steatite, mullite, cordiente, boron nitride, zirconia toughened aluminum, and mixtures thereof. Preferably the ceramic material will be selected from silicon carbide, silicon nitride, aluminum nitride, and alumina. Most preferably the ceramic material will be silicon carbide or silicon nitride. The ceramic materials possess coefficients of thermal expansion substantially lower that those of any known metal over the temperature range of greatest practical interest, i.e. between room temperature and about 500° C. or higher.

The metals which may be joined to the ceramics in this invention include all known metals. Specific examples of such metals include carbon steels, stainless steels, cast iron, aluminum, Kovar TM (Ni 29%, Co 17%, Mn 0.3%, Si 0.2% max., Fe balance), Invar TM (Ni 36%, Mn 0.35%, Si 0.2%, C 0.02%, max., Fe balance), super- alloys, titanium, nickel based alloys, copper, and brazing alloys.

Conventional square edged joints between ordinary metals, such as iron or steel, and the low expansion ceramic materials almost always crack unless an intermediate layer of a compliant metal is used, or unless either the metal or ceramic part is extremely thin, i.e. less than about 1 millimeters. The present invention does not suffer from such limitations and thus is particularly applicable to joints in which both joined materials have a thickness of at least one millimeter.

Figure 1:
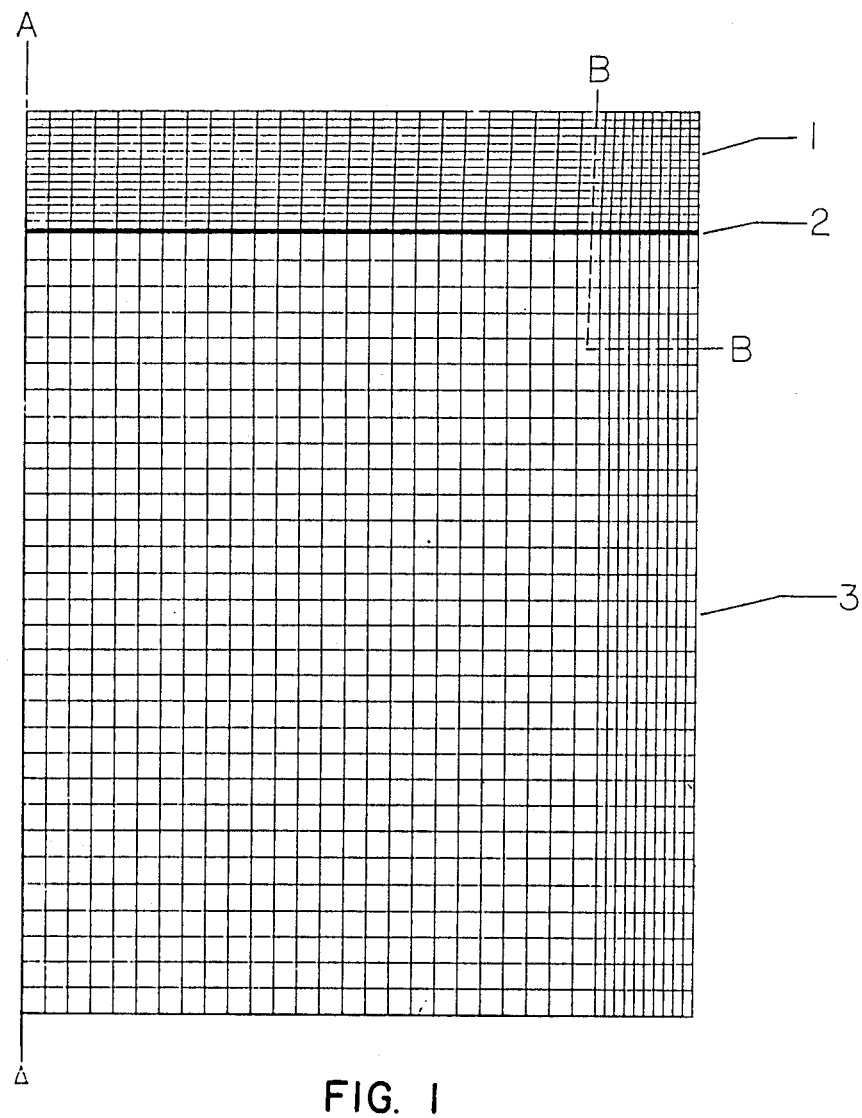
FIG. 1 shows a joint in accordance with this invention between a ceramic rod and a larger diameter metal rod and with an optional interlayer therebetween.

The joints of the present invention have the general shape as shown in FIG. 1 in which a low coefficient of thermal expansion, low fracture toughness ceramic material 1 is joined to a high coefficient of thermal expansion, high fracture toughness metal material 3. Also shown in FIG. 1 is optional, but preferred, interlayer 2. As is evident in FIG. 1, the ceramic material 1 is narrowed or tapered in a direction away from the joint interface and the narrowed/tapered surface is not joined to the metal material 3. Of course, the remote surface of the ceramic material which is not joined, but is essentially parallel to the joining surface, may be further joined to other materials, if desired. By narrowing the low coefficient of expansion, low fracture toughness ceramic material in this manner and not bonding the narrowed/tapered portion of the ceramic to anything, the resultant joint has been found to be better able to withstand stress fractures caused by thermal cooldown of the adherents. The narrowing of the ceramic material commences at the joint interface and extends away from the metal material for at least some finite distance. Generally this distance will be for the entire thickness of the ceramic material, though this is not required. For relatively thick ceramic materials being joined to metals, the narrowing/tapering should extend for a distance of at least about 20% of the largest length dimension of the ceramic material. Thereafter the narrowing/tapering may be discontinued and the ceramic material may remain at this narrowed cross-section as shown in FIG. 1, or it may be widened to the attain the cross-sectional area of the metal to which it is attached or even wider, if desired. Preferably the ceramic will remain at the narrowed cross-section, as would be the case when a ceramic wear surface is provided atop a metal rod or other such metal shape.

The joints of the present invention are readily prepared by narrowing or tapering the ceramic material in any convenient manner. For example, the ceramic may be initially formed having the desired narrowing or the ceramic may be ground to the desired shape by any suitable grinding process. Thereafter, the flat non-narrowed surface of the ceramic is placed in intimate contact with a flat metal surface to which it is to be bonded and the combination is joined by general diffusion bonding techniques. Generally temperatures on the order of 500° C. or higher will be used, but the specific temperature will depend upon the specific materials being joined. In the event that the ceramic and the metal have little or no tendency to adhere to each other, as is quite common, an intermediate cohesive layer must be provided. Even if such an intermediate layer is not strictly necessary, it is often advantageous to use one having greater elastic or plastic compliance than either of the materials being joined, since this may permit accommodation of some strains that otherwise might exist in the joint by stretching or compressing the compliant intermediate layer. In the event such an interlayer is utilized, it may be provided in any standard conventional manner. For example, it may be sputter coated onto the surface of the ceramic, or it may be active metal brazed thereto.

When an interlayer is used between the ceramic and the metal, as shown in FIG. 1, the interlayer material must be one which is stable at elevated temperature, i.e. above about 150°–200° C. Examples of suitable interlayer materials include very thin, i.e. about 1 to about 5 mil, copper, nickel, aluminum, and similar metals which are different from the metal being joined to the ceramic; active metal braze compositions such as those which are based upon silver, gold, palladium, and the like; and sputter coatings of active metals such as titanium, nickel, and the like. These interlayer materials are all well known in the art of joining and further details thereon may be found in the literature. A particularly good, relatively low temperature active metal braze composition is one comprising about 59% silver, 27% copper, 13% indium and 1% titanium. When an interlayer is used, it is placed between the surfaces to be joined and the composite structure is heated for an extended period until the joining operation has been completed. Also when an interlayer is used the extent of narrowing/tapering need not be as severe as when no such interlayer is present at the joint, i.e. the interlayer serves to make a joint more compliant and thus less narrowing of the low coefficient of thermal expansion material is required to prepare a serviceable joint.

It has been found that the strength of a particular joint made in accordance with the present invention is generally a function of the angle at which the material with the lower coefficient of thermal expansion narrows or tapers as one moves farther away from the joint and before that material widens out, if ever. The optimum angle for any pair of materials to minimize the tendency of cracking and joint failure therefrom may be estimated by means of finite element analysis, as discussed further below in reference to the figures. If an interlayer is used to form the joint, the presence of this material must be taken into account in the finite element analysis used to determine the best taper for the joint in question.

Figure 2:
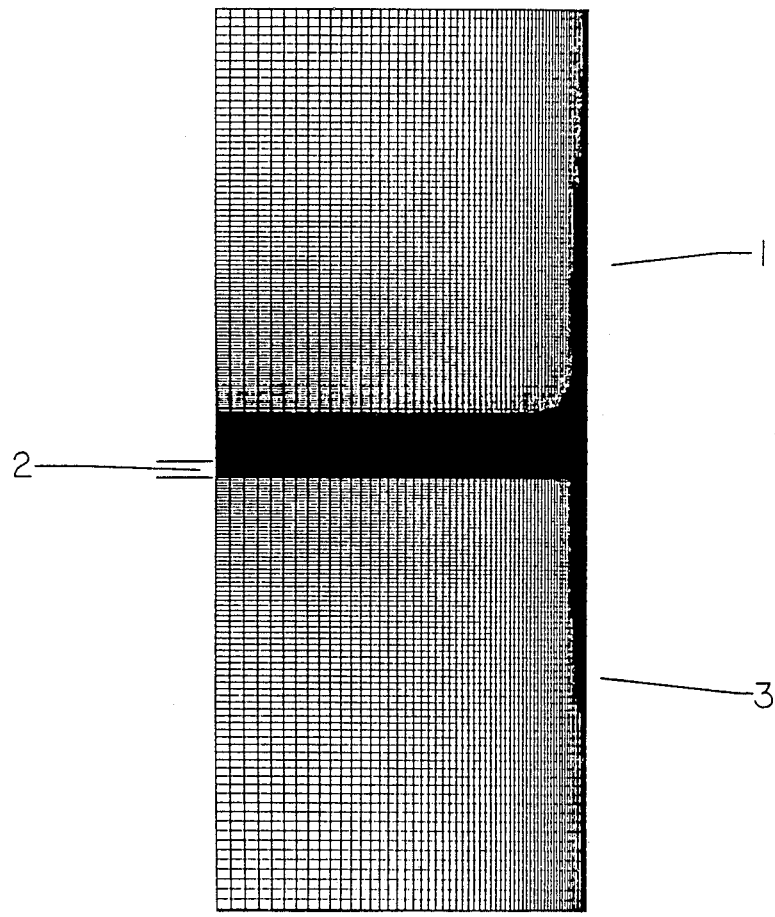
FIGS. 2 and 3 show the preliminary and part of the final mesh respectively used in calculating, by finite element analysis, the stress in a particular conventional joint with straight edges.

The tendency toward cracking can be readily understood with the aid of FEA and the accompanying figures. FIG. 2 shows the preliminary mesh used in an initial trial FEA calculation for a particular joint. The full joint is a cylinder that is axisymmetric around axis A—A in this figure, so that what is shown in the Figure is a half cross section of the actual joint. The axisymmetric nature of the joint assures that the stress in any part of the actual joint will not be higher than the highest value in any such half cross section. In this and all subsequent figures, material 1 is silicon nitride, with an average modulus of rupture of about 810 MPa, a fracture toughness of 3.2 MPa m$^{0.5}$, a Weibull characteristic strength of 947 MPa mm$^{(2/M)}$, where M is the Weibull modulus, for strength limited by surface flaws, a characteristic strength of 983 MPa mm$^{(3/M)}$ for strength limited by volume flaws, and Weibull moduli of 11 for both kinds of failure; interlayer material 2 is a braze metal alloy with a composition by weight of 59% silver, 27% copper, 13% indium, and 1% titanium, a 1.25% strain to tensile failure at a strain rate of 0.21 millimeters/meter/sec, a tensile yield strength of 238 MPa at 0.2% offset, an ultimate tensile strength of 276 MPa, and a Young's modulus of 71 GPa; and material 3 is Type 446 stainless steel.

The preliminary calculation made with the mesh shown in FIG. 2 indicated, as expected, that the highest stresses are restricted to the neighborhood of the two bond termini, between the braze metal and the two primary constituents of the joint to which the braze metal is attached. Attention was therefore concentrated on this region in a more refined calculation.

Figure 3:
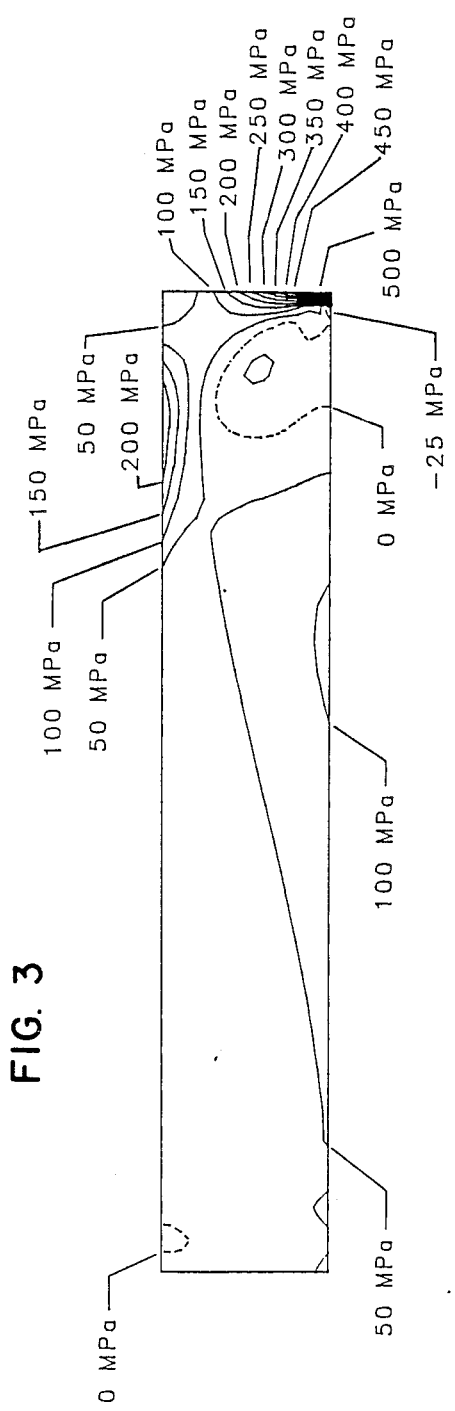

FIG. 3 depicts part of the finer mesh used in a more refined calculation by the same method, for the portion of FIG. 1 with its left and lower boundaries along the line B—B of FIG. 2. The dark areas of FIG. 2 indicate that the mesh defining lines are crowded too close together to resolve on the scale of the figure. The actual mesh size used in this region, as in all the rest of the Figure, is numerically specified as follows:

There are twenty cells of equal height, specifically 0.00508 mm, along each vertical line within the braze layer 2. There are 119 cells in the vertical direction in the silicon nitride layer 1 and 75 cells in the vertical direction in the steel layer 3, but in materials 1 and 3 the cells do not have equal heights. Instead, if the cells in these two materials are numbered with consecutive integers increasing away from the interface, the height $h_{1n}$ in mm of the n'th cell from the interface in material 1 is given by the formula $h_{1n} 0.000446n + 0.00715$, while the cell height $h_{3n}$ in mm of the nth cell from the interface in material 3 is given by the formula $h_{3n} = 0.000725(n) + 0.01796$.

The width of the cells of the mesh is the same in all three materials along a vertical line, but the width increases as the distance from the right edge of the Figure increases. If the cells are numbered from right to left, the width $w_m$ in mm of the mth cell is given by the formula $w_m = 0.00146m + 0.0110$. There are sixty cells across the width of FIG. 3.

A major reason for the choice of the dimensions of the mesh cells used in FIG. 3 is that the size of the strength controlling flaws in the silicon nitride used in this joint is about 0.025 mm, as determined by conventional fractography on this particular material, and experience has shown that there is little practical value to FEA calculations using mesh sizes less than about one-third of this average flaw size. If the maximum stress calculated using this practical lower limit on the fineness of the mesh is higher than the average strength of the ceramic material in a joint, the ceramic is almost sure to break. If the calculated stress does not exceed this limit, Weibull statistics have been found to be reasonably reliable for calculating failure probabilities, even though theoretically a greater refinement mesh might give a higher calculated stress. Plastic yielding, which occurs to a limited extent even in a ceramic, and/or localized microcracking apparently occur to avoid any breakage that might be theoretically expected from calculations of stress that yield very high stress values only when the mesh size is reduced below about one-third of the size of the average strength controlling flaw size.

Figure 4:
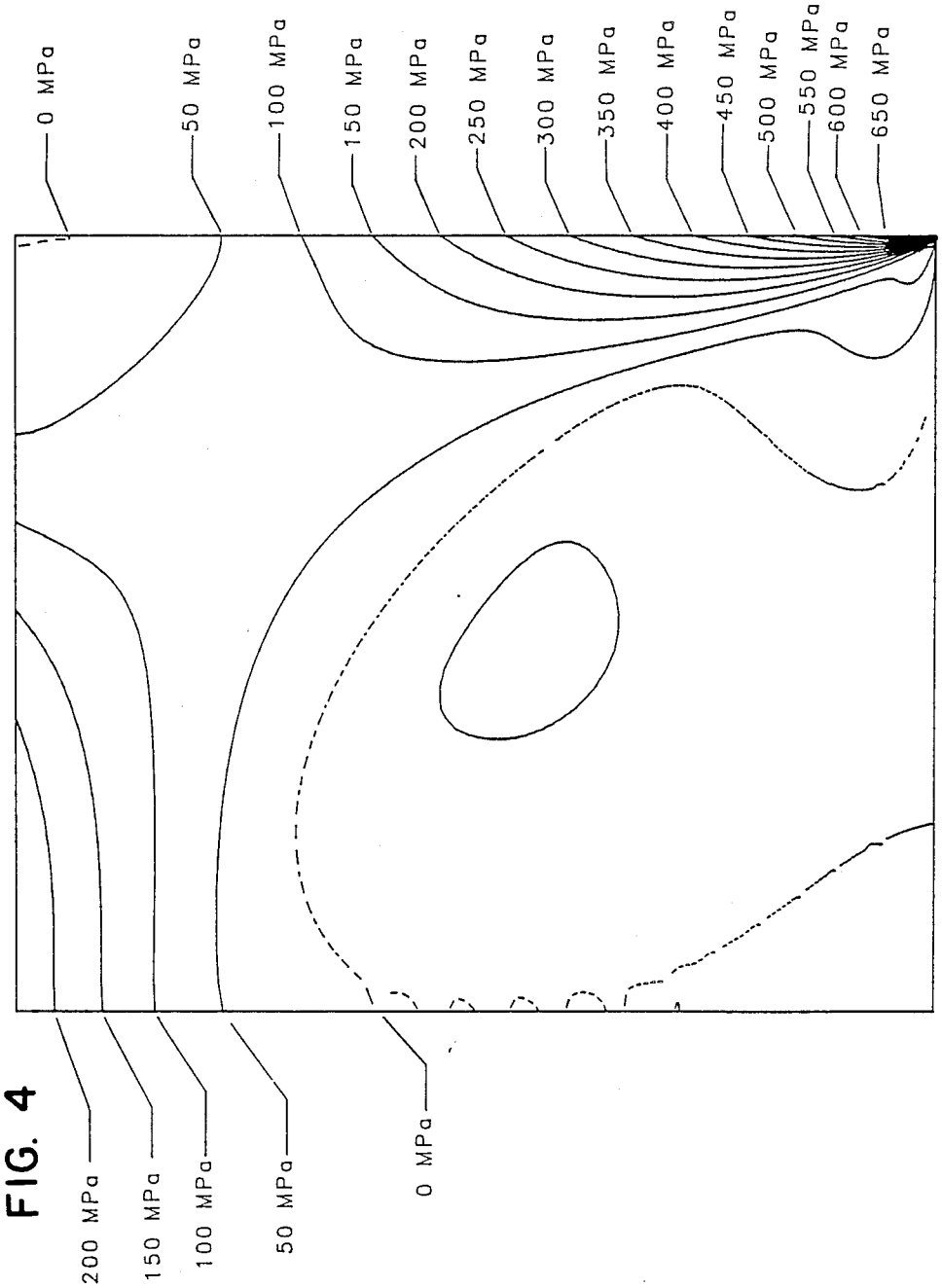
FIGS. 4 and 5 show isostress lines, in material 1 only, from the resulting calculations, on a smaller and larger scale respectively.
Figure 5:
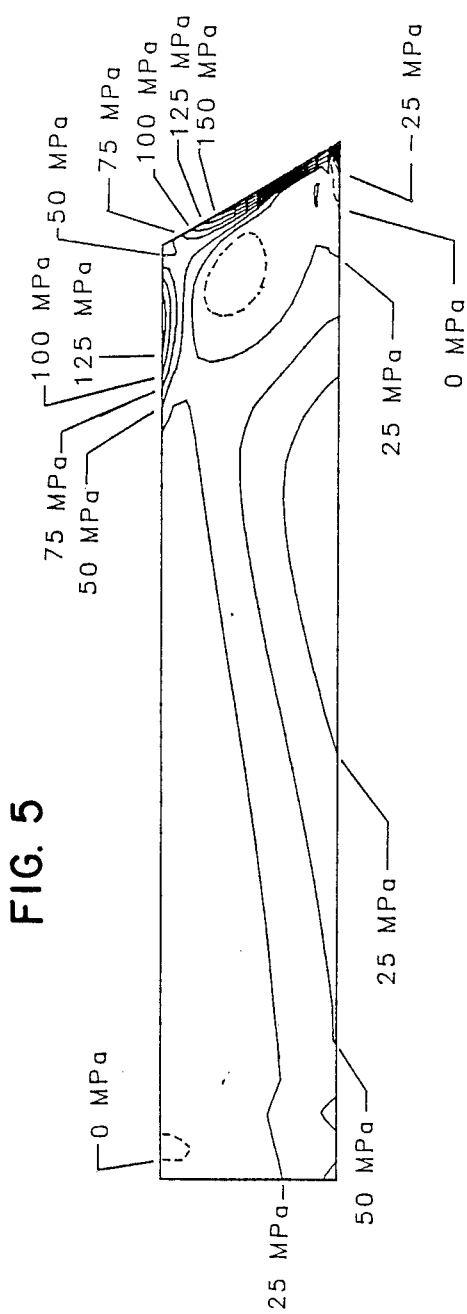

FIG. 4, which has the same scale as FIG. 2, is a plot of the first ten isostress lines, at intervals of 50 MPa, in material 1 only, for a joint at a temperature of 20° C., when the joint was formed initially at 600° C. The zero isostress line(s) in this and subsequent figures are dashed; all other isostress lines are solid. These lines were calculated using the mesh shown in FIG. 2, except for the region to the upper right of line B—B, for which the finer mesh partially shown in FIG. 3 and numerically specified above was used instead. The isostress lines shown in the Figure are adequate to cover all the actual stresses calculated for the joint, except in the lower right corner, i.e., the bond terminus area, where the isostress lines crowd too close together to label in the Figure. FIG. 5 shows isostress lines for the portion of material 1 included within FIG. 3 and at the same scale as that figure. On this larger scale, isostress lines up to 650 MPa are shown, but numerical calculations show that the actual stress in the bond terminus region rises to at least 1440 MPa, far over the average tensile strength of the silicon nitride material. Therefore, such joints are expected to, and do, almost always crack.

The FEA for this example, like all of those shown herein unless otherwise noted, is a "worst case" analysis, because it does not take into account the plasticity of the materials in the joint. Therefore, the FEA stress value itself can not guarantee breakage, but the cracking of square edged joints of the type shown in FIG. 1 has been amply confirmed by experiment.

Figure 6:
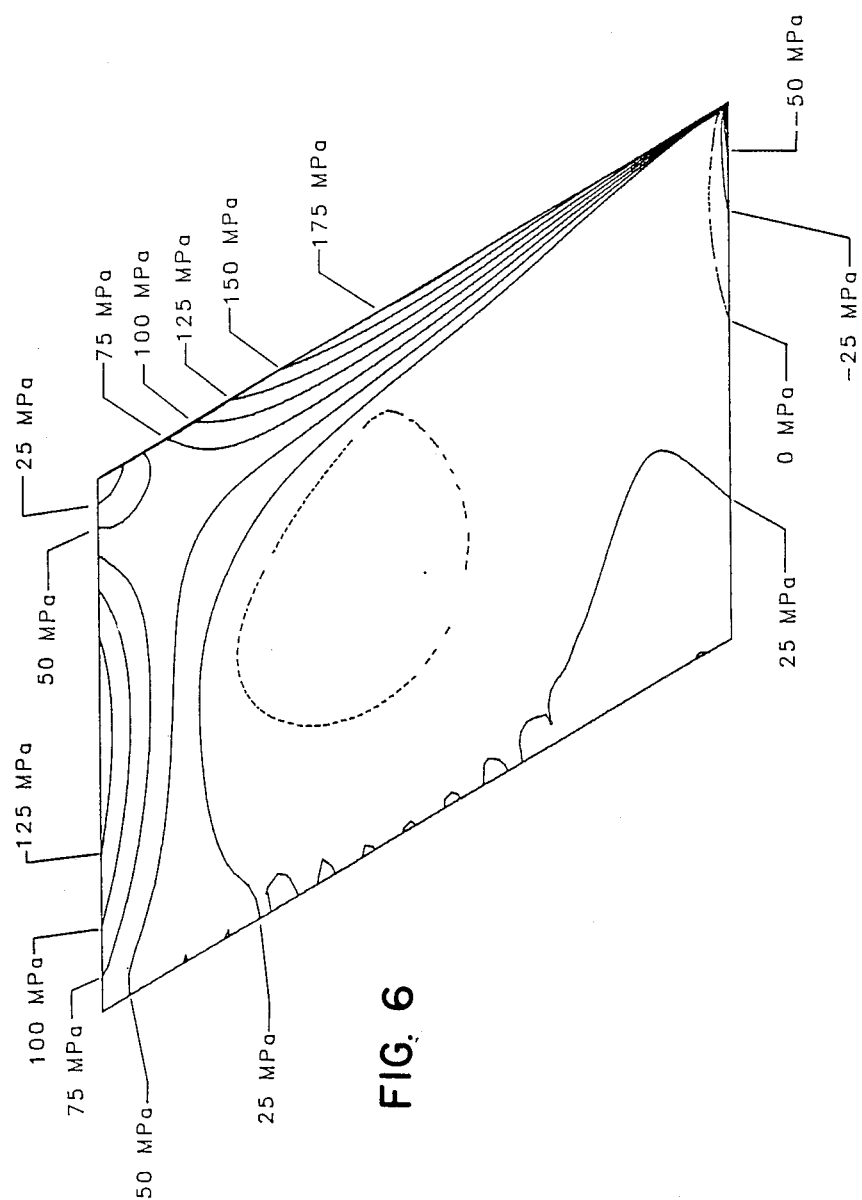
FIGS. 6 and 7 show the isostress lines for an otherwise imilar joint to that of FIGS. 4 and 5 but having a sixty degree taper.
Figure 7:
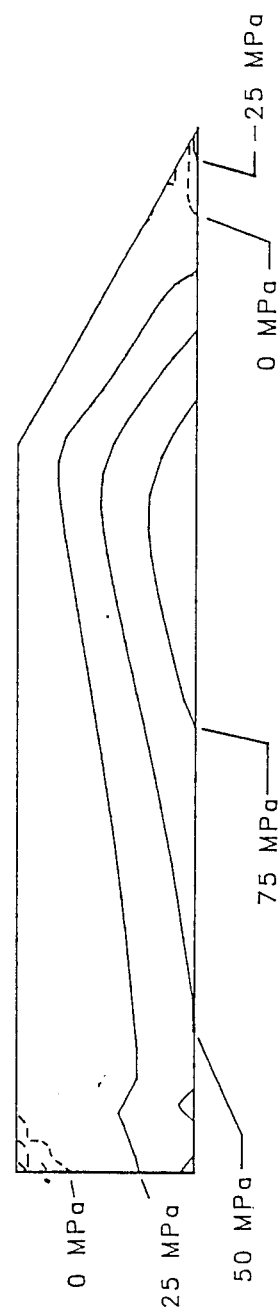

FIGS. 6 and 7 show the isostress lines on the same scale as FIGS. 4 and 5 respectively, but for joints with an angle of 60° at the bond terminus. The mesh structure used for FIG. 6 was the same as shown in FIG. 2, except that the rectangles of the mesh of FIG. 2 were changed to parallelograms, with horizontal bases and sides at 60 degree angles to the bases, for the calculations that resulted in FIG. 6. The vertical heights of the parallelograms of this mesh were the same as the heights of the corresponding rectangles in FIG. 2, and the widths of the bases of the parallelograms in the mesh used for FIG. 6 were the same as the widths of the bases of the rectangles shown in FIG. 2. The mesh used for FIG. 7 was made by transforming the rectangles of the mesh shown in FIG. 3 and numerically described above into parallelograms by the same principles as used for transforming the rectangles of the mesh in FIG. 2 into the mesh of parallelograms for FIG. 6.

FIGS. 6 and 7 show that the point of maximum stress in a joint with a 60° taper is still at the bond terminus. Even though the highest isostress line shown in even FIG. 7 is for 175 MPa, the lines crowd together in the bond terminus region so quickly that they can not be adequately shown, and numerical calculations give a maximum stress value of 665 MPa. For the reasons already given, further refinement of the mesh size is not practically useful, even though there are indications of singularity at the the bond terminus in the calculations. Application of Weibull statistics, using the Weibull modulus of 11 and the characteristic strength (for surface flaws) of 983 MPa mm$^{(2/M)}$, where M is the Weibull modulus, for this silicon nitride material shows that the joint with a 60° taper has a 94.8% probability of survival without a crack in the ceramic.

Figure 8:
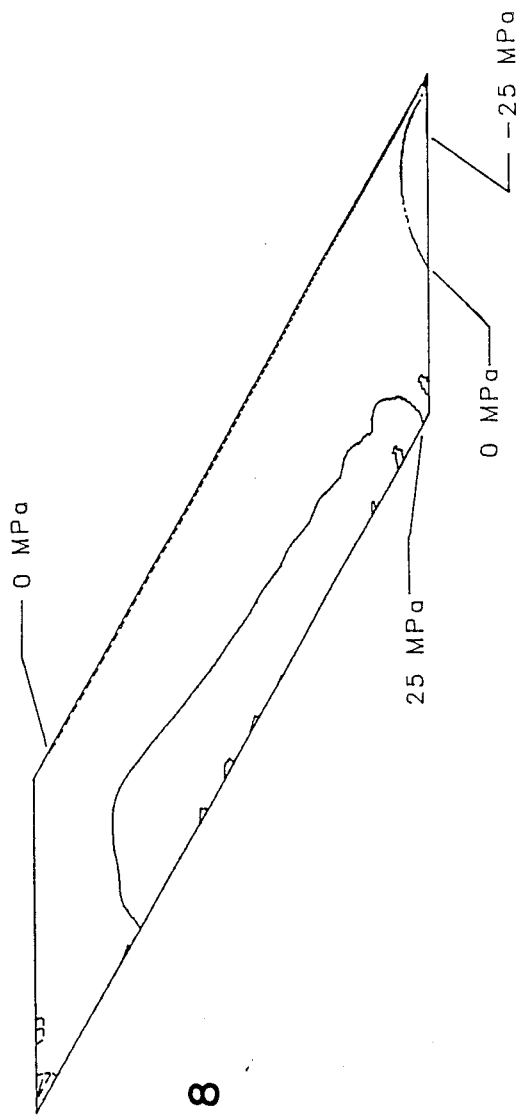
FIGS. 8 and 9 show the isostress lines for an otherwise similar joint to that of FIGS. 4 and 5 but having a thirty degree taper.
Figure 9:
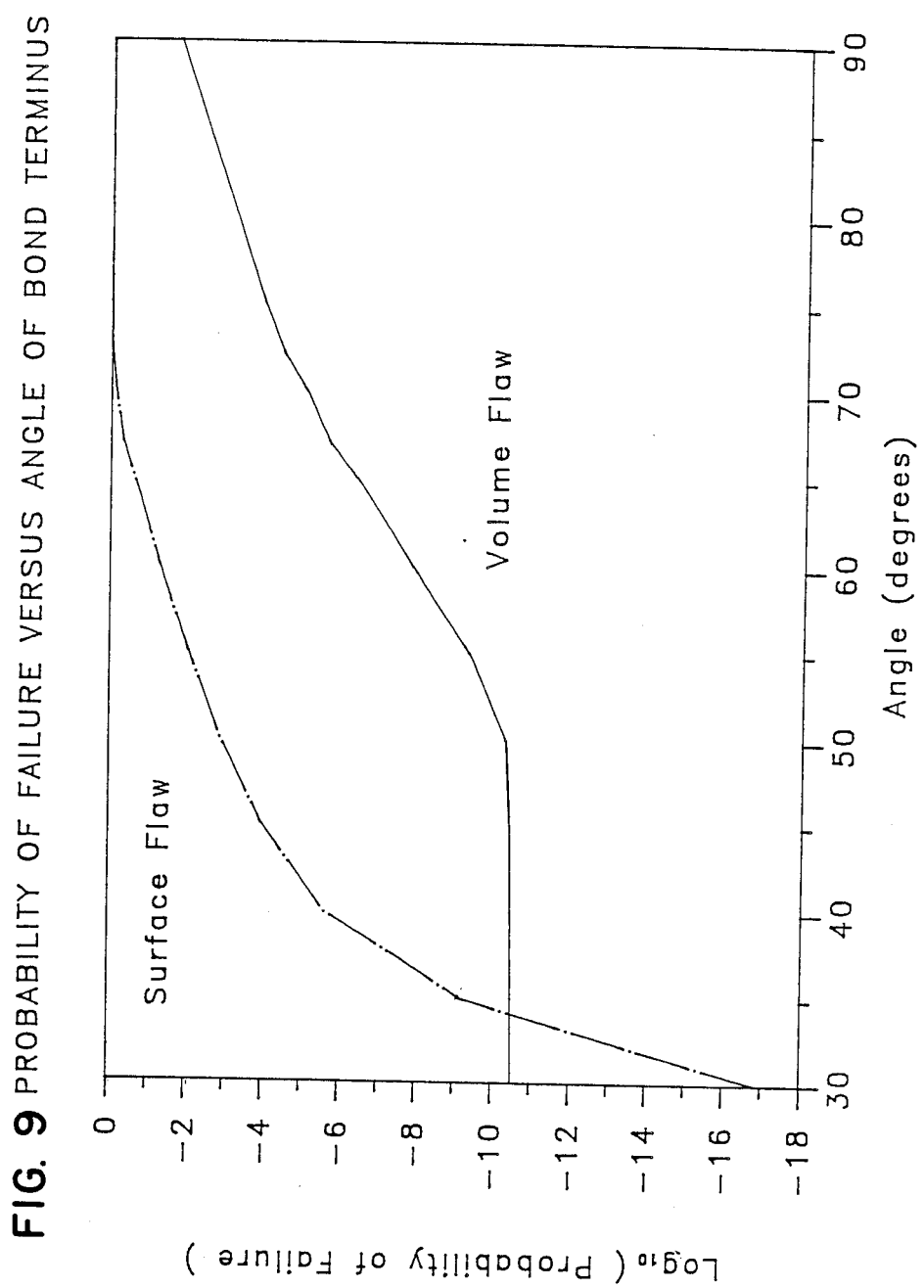

FIGS. 8 and 9 show isostress lines on the same scales as FIGS. 6 and 7 respectively, but for a joint with an angle of 30° at the bond terminus. The mesh used for calculating the isostress lines in these Figures was a mesh of parallelograms as described for FIGS. 6 and 7 respectively, except that the parallelograms had sides at an angle of 30° to the bases.

For this joint with a 30° taper, the maximum stress has decreased to a level of <100 MPa and is no longer at the bond terminus. Application of Weibull statistics shows that such a joint has a probability of cracking of only $10^{-6}$. A joint of this type has been made experimentally and found in fact to be free from any cracks visually detectable, even with magnification, on its external surface at room temperature.

Figure 10:
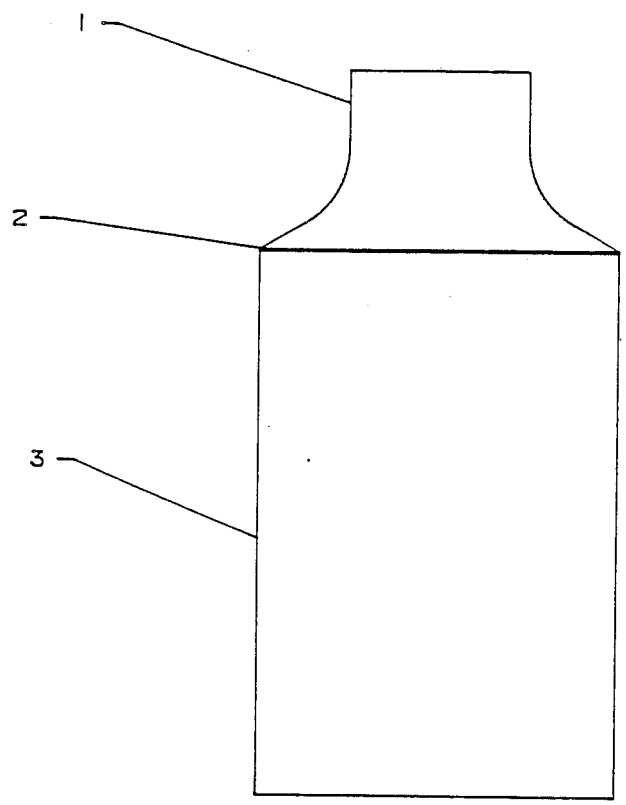
FIG. 10 shows the probability of failure within material 1 for joints displaying various angles of taper.

Calculations of the same type have been made for several other joint angles, and the results are shown in FIG. 10. This shows that failure from surface flaws is virtually certain for angles greater than about 70°, but falls rapidly at lower angles. The probability of failure from volume flaws is never more than about 1%, but it falls more slowly with increasing taper, until at about 35 degrees it becomes the failure limiting factor. Failure probabilities are below any normal practical interest for joints with such low taper angles.

A joint with the shapes and relative sizes of the three materials shown in FIGS. 8-10 could serve effectively as a tappet in an engine, with the silicon nitride functioning as a wear resistant cap on the stainless steel.

A lower limit on the reliability of a joint between bodies of any shape can be determined by FEA as described above. For many materials it will be satisfactory to use "worst case" FEA, neglecting the effects of plasticity and elasticity of the materials in the joint, but more exact FEA can always be performed if desired. The scope and practice of the invention for joining bodies which do not retain their tapered shape in parts distant from the bond are can be further illustrated from the following additional specific examples.

EXAMPLE 1

FIG. 1 shows the overall shape of a joint containing the same three materials 1, 2, and 3 as in FIG. 2. Here the silicon nitride part 1 is tapered away from joint but has a straight part in the region more remote from the joint, connected to the remainder of the silicon nitride by a smoothly curved volume. Such a joint is suitable for a structure in which a narrow diameter rod of silicon nitride is bonded, through an intermediate layer of braze metal, to a larger diameter metal rod.

Figure 11:
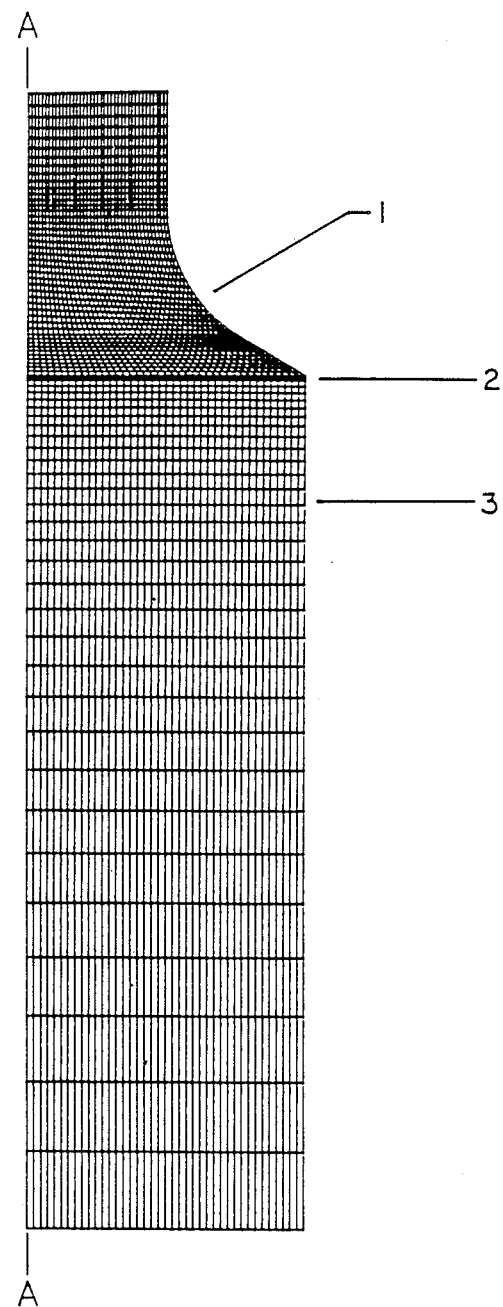
FIGS. 11–13 show, on increasingly larger scales, the mesh cells used for a finite element analysis calculation of the stresses in the joint of FIG. 1.
Figure 12:
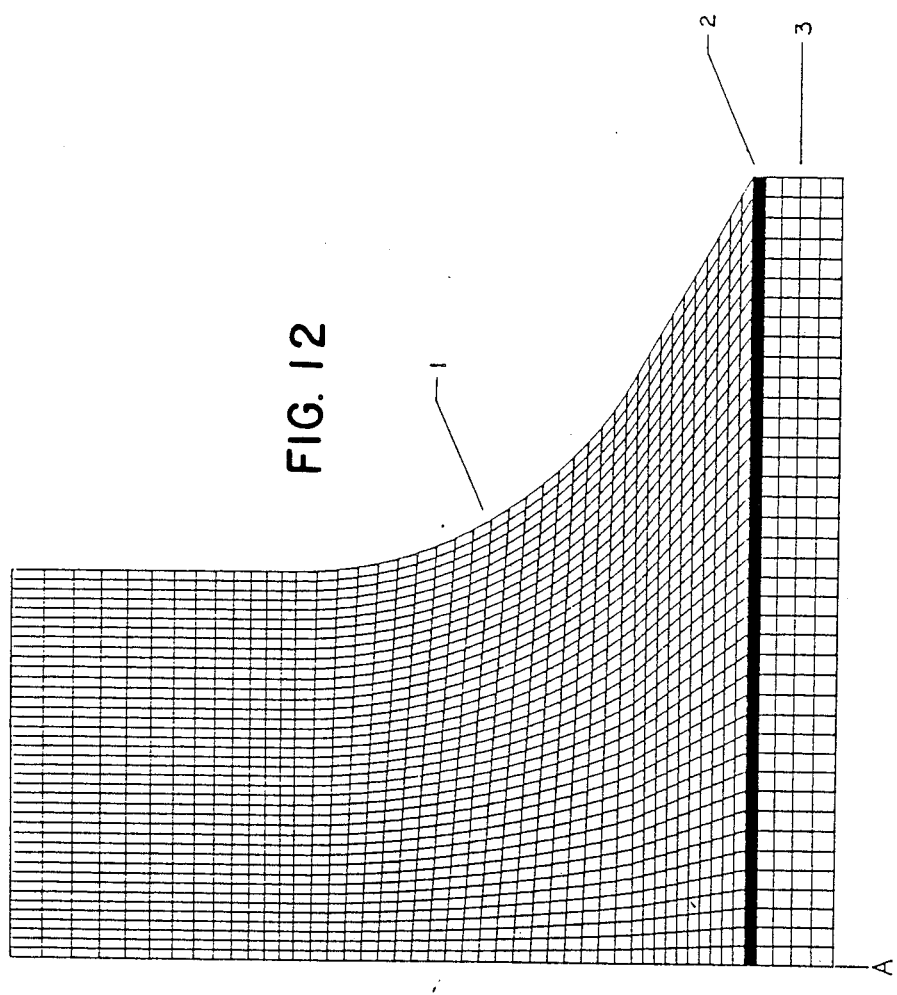
Figure 13:
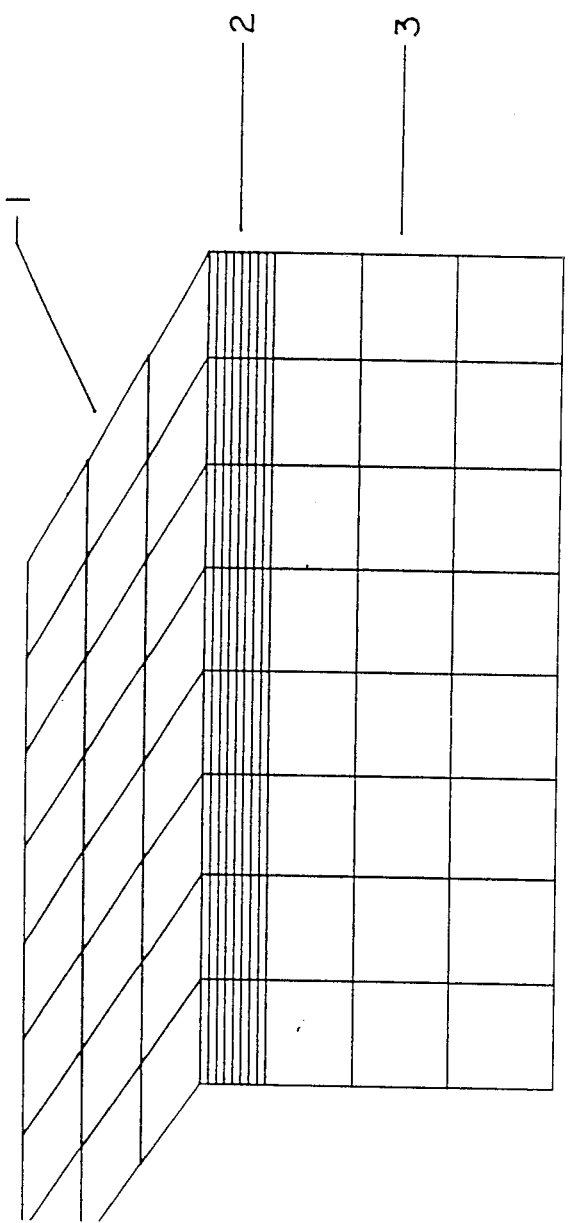

This joint also is axisymmetric; FIG. 1 shows a full cross section, but the remaining figures, depicting the same joint, show only half sections or parts of half sections. FIG. 1 shows the mesh used for calculations on a half section of this joint with a straight extension. FIG. 12 shows the detail of the mesh used in the critical area near the bond terminus, on a larger scale than FIG. 11, and FIG. 13 shows the mesh in the most critical part of the mesh near the bond terminus on a still larger scale than FIG. 12; it may be noted in FIG. 12 that the braze metal part 2 of the joint has eight mesh cells across its thickness, although the cells are so crowded on the scale of FIG. 11, and even FIG. 12, that they appear as a narrow solid shaded area.

Figure 14:
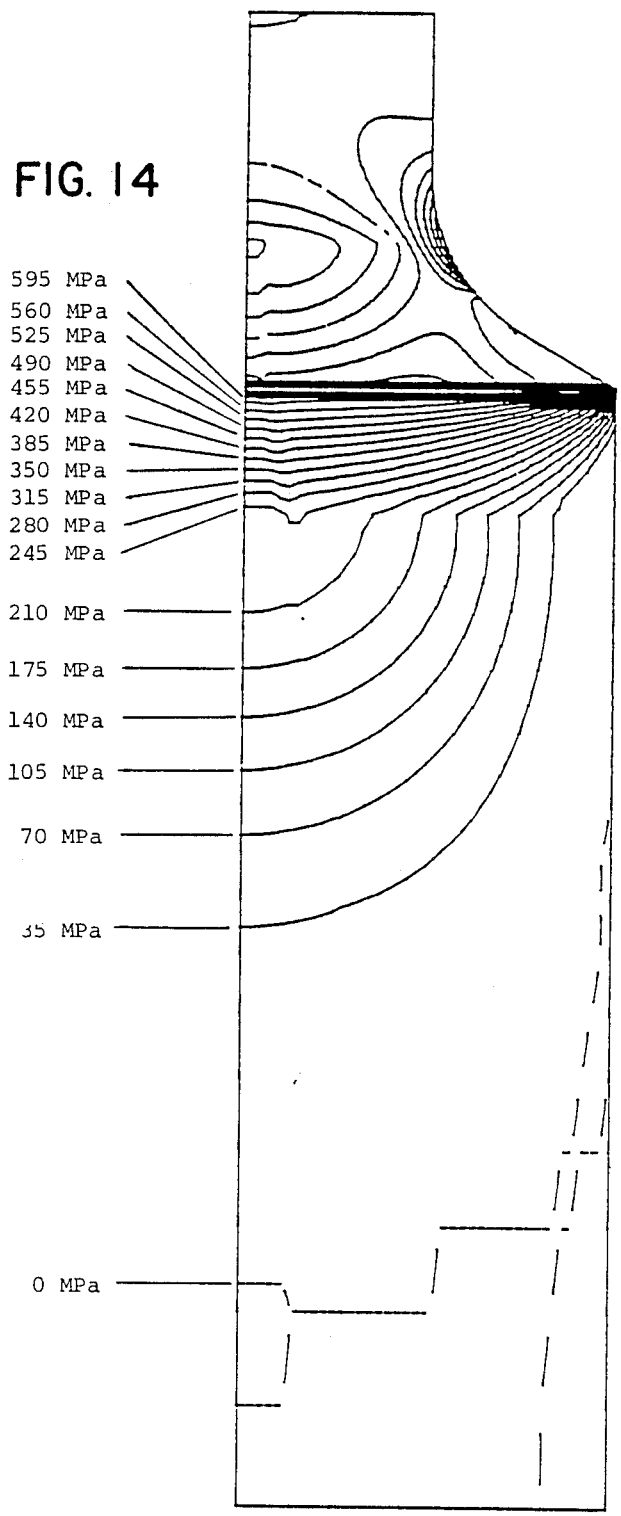
FIGS. 14 and 15 show the calculated isostress lines for the metal and ceramic portions respectively of FIG. 1.
Figure 15:
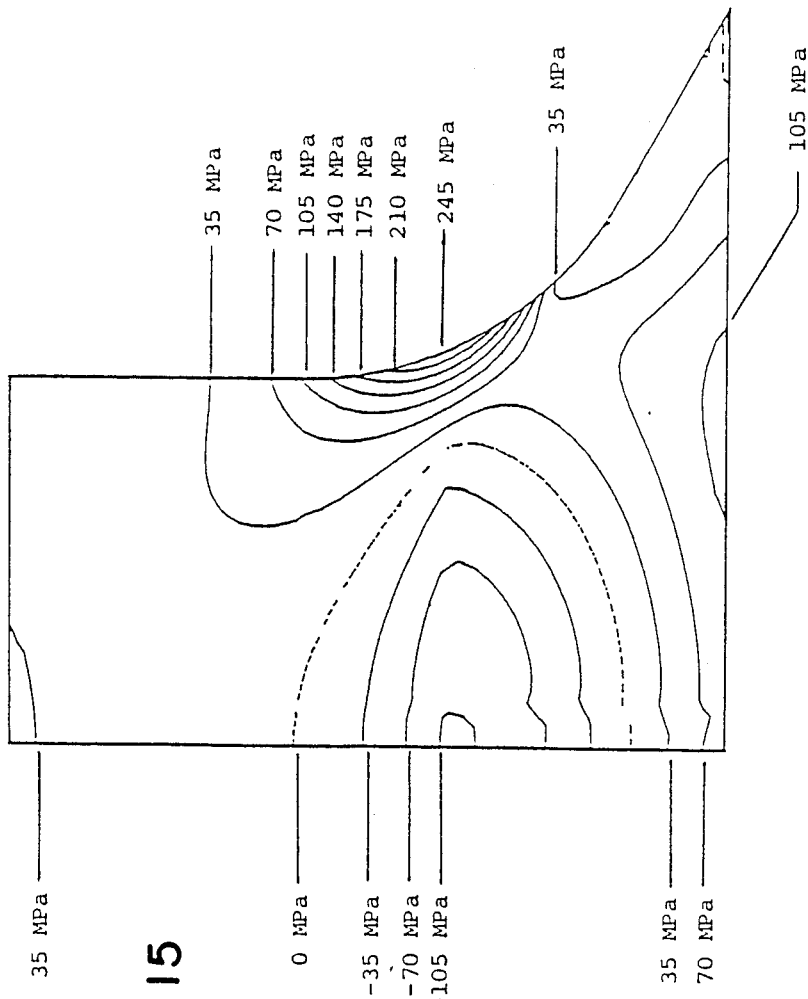

FIG. 14 shows the isostress lines in the metal portion of the joint. Although these stresses are high, the metal is able easily to accommodate them without fracture, by ductile yielding when necessary. FIG. 15 shows the isostress lines, at 35 MPa intervals, in the silicon nitride part 1 of the joint shown in FIGS. 1 and 11-14. The region of highest stress in the ceramic part of this structure is within the curve along which the tapered section blends with the straight part of the ceramic rod. The largest tensile stress value is finite and well within the allowable stress limits for the silicon nitride. A failure probability of only about $6 \times 10^{-4}$ is predicted for this structure by Weibull statistics.

EXAMPLE 2

A structure suitable for shaft attachment and including a joint, over 12 mm in diameter, made according to this invention between silicon nitride and the same braze metal as described above was tested for total adhesion of the joint. The joint survived a tensile stress of 25 megapascals at room temperature without any evidence of damage. This is believed to be the highest value for such a large butt joint between these two materials, without using an intermediate layer at least 0.25 mm thick of a highly ductile metal such as copper or gold.

The term "taper" as used herein is intended only to define a zone outside which none of the first material in the type of joint described herein should extend. It is not necessary that the first material be shaped along a linear path as illustrated in the drawing figures herein, but only that the surface of this first material should lie inside the zone defined by the lines similar to the taper lines in these figures, at whatever angle of taper is needed to lower the probability of failure below the desired tolerance level.

What is claimed is:

1. A composite structure comprising a first material and a second material joined to the first material so as to form a joint interface therebetween, the first material having (i) a lower coefficient of thermal expansion (CTE) and (ii) a lower fracture toughness ($K_c$) than the second material, and wherein the first material has a tapered surface beginning at the joint interface and continuing in a direction away from the joint interface and the tapered surface being unjoined to the second material.

2. The composite structure of claim 1 wherein the joint has been produced at a temperature higher than the temperature at which the joint is intended for service.

3. The composite structure of claim 1 wherein the first material is a ceramic.

4. The composite structure of claim 3 wherein the ceramic is selected from the group consisting of predominantly silicon carbide, silicon nitride, or mixture thereof.

5. The composite structure of claim 1 wherein the second material is a metal or metal alloy.

6. The composite structure of claim 5 wherein the metal or metal alloy is selected from the group consisting essentially of carbon steel, cast iron, aluminum, Kovar ™, Invar ™, titanium, and copper.

7. The composite structure of claim 5 wherein the metal or metal alloy is a superalloy.

8. The composite structure of claim 5 wherein the metal or metal alloy is a nickel-based alloy.

9. The composite structure of claim 5 wherein the metal or metal alloy is a brazing alloy.

10. The composite structure of claim 1 wherein the tapered surface is at an acute angle from the horizontal plane of the joint interface which angle, based upon finite element analysis, yields an acceptable calculated probability of failure at about the lowest temperature to which the structure is expected to be subjected.

11. The composite structure of claim 1 wherein the joint has a tensile strength per unit area of joint of at least about 20 MPa.

12. The composite structure of claim 1 wherein the first material has a thickness perpendicular to the joint of at least about one millimeter in at least a part of its area.

13. The composite structure of claim 1 wherein the tapered surface of the first material extends around essentially the entire periphery of the joint interface.

14. The composite structure of claim 1 wherein the first and second materials have been joined together by each being joined to a third material which has a compliance greater than either of said first or second materials.

15. The composite structure of claim 14 wherein the third material is a highly ductile metal layer.

16. The composite structure of claim 14 wherein the third material is a braze metal alloy.

17. The composite structure of claim 16 wherein the braze metal alloy comprises, by weight, about 59% silver, 27% copper, 13% indium, and 1% titanium.

18. In an article of manufacture comprising a joint adhered over a fixed area between (a) a first material having (i) a first coefficient of thermal expansion (CTE), (ii) a first fracture toughness ($K_c$), (iii) a first modulus of rupture, and (iv) a first compressive strength that is greater than the first modulus of rupture, and (b) a second material having (i) a second CTE that is greater than the first CTE and (ii) a second $K_c$ that is greater than the first $K_c$, the joint being intended for service at a temperature which is lower than the temperature at which the joint is formed, the improvement wherein (i) the first material is tapered sufficiently beginning at the joint interface (ii) the tapered surface of the first material is not bonded to the second material, and (iii) the first material is shaped in the part remote from the vicinity of the joint so that the maximum tensile stress predicted within any part of the first material by finite element analysis at the lower temperature does not exceed the modulus of rupture of the first material at the lower temperature.

19. The article of claim 18 wherein Weibull moduli and Weibull characteristic strengths of the first material for failure by surface and by volume flaws are known and wherein a number less than about 0.6 but greater than zero is selected as the acceptable probability of failure for the joint, wherein the tensile stresses predicted within the first material at the lower temperature by finite element analysis, together with the Weibull moduli and Weibull characteristic strengths, yields a calculated probability of failure for the joint that is not greater than the acceptable probability.

20. The article of claim 18 wherein at a temperature between the joint formation temperature and the lower temperature the first material has a coefficient of thermal expansion of not more than $5 \times 10^{-6}/°C$ and the second material has a coefficient of thermal expansion of not less than $10 \times 10^{-6}/°C$.

21. The article of claim 18 wherein the first material is predominantly silicon carbide, silicon nitride, or a mixture thereof and the second material is a metal or alloy.

22. The article of claim 18 wherein the joint has a tensile strength per unit area of joint of at least 20 MPa and the first material has a thickness perpendicular to the joint of at least one millimeter in at least a part of its area.

23. The article of claim 18 wherein the first and second materials have been joined by each being joined to a third material which has a compliance greater than either of said first or second materials.

24. The article of claim 23 wherein the third material is a highly ductile metal layer.

25. The article of claim 23 wherein the third material is a braze metal alloy.

* * * * *